L. FARKAS.
MEASURE OR GAGE.
APPLICATION FILED DEC. 4, 1911.
1,035,175.
Patented Aug. 13, 1912.
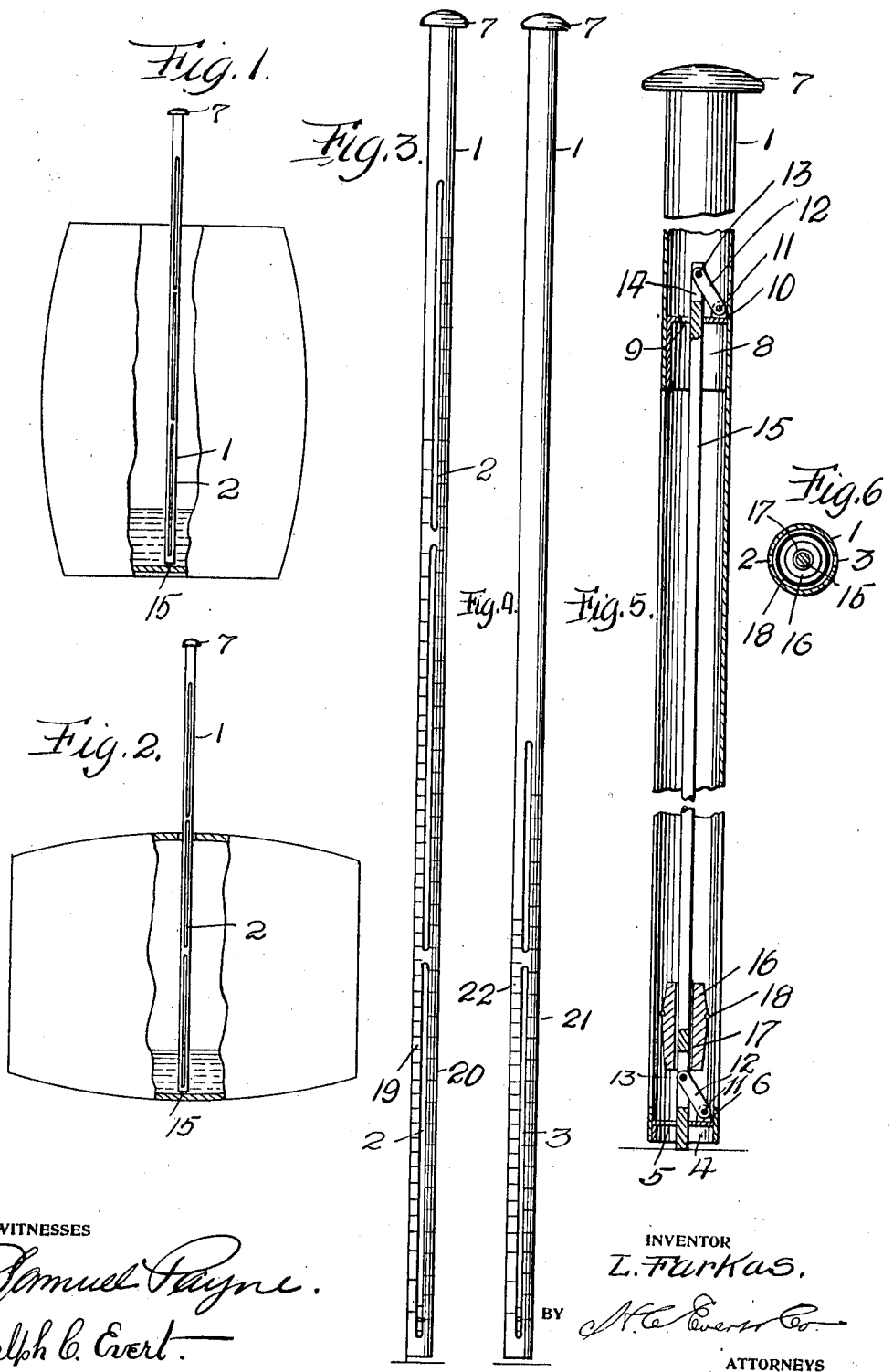
WITNESSES
Samuel Payne.
Ralph C. Evert.
INVENTOR
L. Farkas,
BY
ATTORNEYS

UNITED STATES PATENT OFFICE.

LOUIS FARKAS, OF CLEARFIELD, PENNSYLVANIA.

MEASURE OR GAGE.

1,035,175.   Specification of Letters Patent.   Patented Aug. 13, 1912.

Application filed December 4, 1911. Serial No. 663,760.

*To all whom it may concern:*

Be it known that I, LOUIS FARKAS, a citizen of the United States of America, residing at Clearfield, in the county of Clearfield and State of Pennsylvania, have invented certain new and useful Improvements in Measures or Gages, of which the following is a specification, reference being had therein to the accompanying drawing.

This invention relates to a measure or gage especially designed for distillers, spirit rectifiers, and persons handling or dealing in barrels or other receptacles containing liquid.

The primary object of my invention is to provide a gage or measure that can be easily and quickly placed in a barrel or other receptacle to determine the quantity of liquid within the barrel or receptacle, the gage being designed whereby it can be used in connection with a barrel in an upright position or in a horizontal position. Provision is also made whereby the gage or measure can be used in connection with a half barrel.

Another object of this invention is to provide a measure or gage that is constructed upon the float principle, that is, a measure or gage having a float that determines the level of a liquid within a receptacle. Associated with the float there is a novel locking device that holds the float while the measure or gage is removed from the receptacle, and it is through the medium of the positioned float and graduations upon the measure or gage that the quantity of liquid within the receptacle is determined.

A further object of this invention is to provide a measure or gage of the above type that can be safely carried and used, the measure consisting of comparatively few parts inexpensive to manufacture, durable and highly efficient for the purposes for which they are intended.

With the above and other objects in view, the invention resides in the novel construction, combination and arrangement of parts to be hereinafter specifically described and then claimed.

Reference will now be had to the drawing, wherein:—

Figure 1 is a side elevation of a barrel in an upright position, partly broken away and partly in section, showing the measure or gage within the barrel, Fig. 2 is a similar view of a barrel in a horizontal position, showing the gage or measure inserted in the barrel, Fig. 3 is a front elevation of the measure or gage, Fig. 4 is a side elevation of the same, Fig. 5 is an enlarged longitudinal sectional view of a portion of the measure or gage, and Fig. 6 is a horizontal sectional view of the measure or gage.

A measure or gage in accordance with this invention comprises a tube 1 preferably made of metal, brass or any other metal is used that is not susceptible to a chemical action when immersed in whisky, wine, vinegar or other commercial liquid. The tube 1 has one side thereof provided with a row of slots 2. These slots are approximately the same length, said slots being longitudinally disposed and extending from the lower end of the measure or gage to a point in proximity to the upper end. The opposite side of the tube is provided with a longitudinal row of slots 3, but these slots are arranged in proximity to the lower end of the tube. The first mentioned slots permit of the measure or gage being used in connection with a barrel 4, when in an upright position, and the slots 3 allow the measure or gage to be used in connection with a barrel in a horizontal position or in connection with a half barrel, keg or other receptacle.

The lower ends of the tube 1 is provided with a horizontal partition 4, said partition having a slot 5 formed therein. The partition 4 is in the form of a cup that is mounted in the lower end of the tube, and the inner side of the partition has a bearing 6.

The upper end of the tube 1 is provided with a head or handle 7 and within said tube, adjacent to the upper end thereof, is another partition 8 that is in the form of an inverted cup. This partition has a slot 9 and a bearing 10, similar to the partition 4.

Pivotally connected to the bearings 6 and 10 by pins 11 are links 12 and said links are pivotally mounted by pins 13 in slots 14 provided therefor in an actuating rod 15. The rod 15 is arranged longitudinally of the tube 1 and the ends thereof extend through the slots 5 and 9 of the partitions 4 and 8 respectively. The lower end of the rod protrudes from the lower end of the tube, as best shown in Fig. 5 of the drawing, and when the tube 1 is lowered, with the lower end of the rod 15 resting upon the bottom or side of the receptacle, the actuating rod 15 is shifted within the slots 5 and 9 toward one of the walls of the tube 1.

Movably mounted upon the rod 15 is a float 16, said float having an opening 17 providing clearance for the rod 15 The float 16, intermediate the ends thereof, has a ring 18 that denotes the displacement or depth to which the float 16 sinks in a liquid, as whisky or water. The ring 18 can be observed through the slots 2 and 3 of the tube 1, and said tube, adjacent to the edges of the slots 2 and 3, is graduated, as at 19 to 22 inclusive.

The contents of a barrel or other receptacle are measured by placing the device in the open end of the barrel, through the bung hole or any other orifice in the barrel or receptacle. Immediately upon the lower end of the device coming in contact with the wall of the barrel or receptacle, the rod 15 is pushed upward, thus releasing the buoyant body or float 16 from its fixed position so that it is permitted to rise upon the rod 15, the float 16 remaining upon the surface of the liquid within the barrel, this is best seen in connection with Figs. 1 and 2 of the drawing, showing the device within a barrel.

When the measuring device is removed from the barrel or receptacle, the weight of the actuating rod 15 and the link 12 is sufficient to cause the rod 15 to descend by gravity, said rod engaging the wall of the opening 17 of the float 16, binding said float against the wall of the tube 1. When the device is removed, the ring 18 can be observed through the slots 2 or 3 and when said ring is compared with the graduations of the tube 1, the exact quantity of the liquid within the barrel or receptacle will be indicated.

It is thought that the operation and utility of the measuring device or gage will be apparent without further description, and it is to be understood that the tube 1 can be provided with various kinds of graduations, whereby the contents of various kinds of receptacles can be measured.

Such other changes as fall within the scope of the appended claims can be resorted to without departing from the spirit of the invention.

What I claim is:—

1. A liquid measuring device comprising a tube having longitudinal slots formed therein, partitions arranged within said tube, an actuating rod movably supported by said partitions, and a float movably mounted upon said rod and adapted to be held against the wall of said tube by the weight of said rod and the connection thereof.

2. A liquid measuring device comprising a slotted tube, links pivotally mounted in said tube, an actuating rod supported by said links, and a float slidably mounted upon said rod and adapted to be held in engagement with the wall of said tube by the weight of said rod and said links.

3. A liquid measuring device comprising a tube, said tube having longitudinal slots formed therein with the wall of said tube graduated adjacent to said slots, partitions arranged within said tube, an actuating rod movably supported within said partitions and having the lower end thereof protruding from the lower end of said tube, whereby said rod can be shifted by placing the lower end of said tube in engagement with the wall of the receptacle, and a float movably mounted upon said rod within said tube and adapted to be held against the wall of said tube by a movement of said tube.

In testimony whereof I affix my signature in the presence of two witnesses.

LOUIS FARKAS.

Witnesses:
 JOHN M. UREY,
 FRANK UREY.

---

Copies of this patent may be obtained for five cents each, by addressing the "Commissioner of Patents, Washington, D. C."